US009327590B2

(12) United States Patent
Ideshio et al.

(10) Patent No.: US 9,327,590 B2
(45) Date of Patent: May 3, 2016

(54) HYBRID VEHICLE

(71) Applicants: Toyota Jidosha Kabushiki Kaisha, Toyota-shi Aichi-ken (JP); Aisin AW Co., Ltd., Anjo-Shi Aichi-Ken (JP)

(72) Inventors: Yukihiko Ideshio, Nissin Aichi-ken (JP); Shinji Matsumoto, Chiryu Aichi-ken (JP); Daiki Suyama, Okazaki Aichi-ken (JP); Katsuhiko Hattori, Nagoya Aichi-ken (JP); Yo Nishioka, Anjo Aichi-ken (JP)

(73) Assignees: Toyota Jidosha Kabushiki Kaisha, Toyota-shi (JP); Aisin AW Co., Ltd., Anjo-Shi (JP)

( * ) Notice: Subject to any disclaimer, the term of this patent is extended or adjusted under 35 U.S.C. 154(b) by 0 days.

(21) Appl. No.: 14/644,506

(22) Filed: Mar. 11, 2015

(65) Prior Publication Data

US 2015/0258885 A1 Sep. 17, 2015

(30) Foreign Application Priority Data

Mar. 14, 2014 (JP) ................................ 2014-052673

(51) Int. Cl.
*B60K 6/44* (2007.10)
*B60K 6/36* (2007.10)
*B60K 6/40* (2007.10)

(52) U.S. Cl.
CPC ... *B60K 6/44* (2013.01); *B60K 6/36* (2013.01); *B60K 6/40* (2013.01); *Y10S 903/909* (2013.01); *Y10S 903/951* (2013.01)

(58) Field of Classification Search
CPC .............. B60K 6/44; B60K 6/36; B60K 6/40; B60K 6/48; B60K 6/405; B60K 6/26; Y10S 903/909; Y10S 903/951; B60W 20/30; F16H 57/0421; F16H 57/0424
See application file for complete search history.

(56) References Cited

U.S. PATENT DOCUMENTS

| | | | | |
|---|---|---|---|---|
| 5,644,954 A | * | 7/1997 | Matsufuji | 74/606 R |
| 7,942,245 B2 | * | 5/2011 | Shimizu et al. | 184/6.9 |
| 2008/0182712 A1 | * | 7/2008 | Kira et al. | 477/7 |
| 2008/0236952 A1 | * | 10/2008 | Shimizu et al. | 184/6.22 |
| 2010/0105518 A1 | * | 4/2010 | Kasuya et al. | 477/5 |
| 2013/0111891 A1 | * | 5/2013 | Iwase et al. | 60/347 |
| 2013/0193816 A1 | * | 8/2013 | Iwase et al. | 310/75 R |
| 2014/0230423 A1 | * | 8/2014 | Iwase et al. | 60/445 |
| 2014/0231174 A1 | * | 8/2014 | Iwase et al. | 184/6.12 |
| 2014/0305389 A1 | * | 10/2014 | Iwase et al. | 123/2 |
| 2014/0305721 A1 | * | 10/2014 | Iwase et al. | 180/65.22 |
| 2014/0311425 A1 | * | 10/2014 | Iwase et al. | 123/2 |
| 2014/0326105 A1 | * | 11/2014 | Kasuya et al. | 74/661 |
| 2015/0000262 A1 | * | 1/2015 | Iwase et al. | 60/330 |
| 2015/0027273 A1 | * | 1/2015 | Iwase et al. | 74/665 B |

FOREIGN PATENT DOCUMENTS

JP 2013-155810 A 8/2013

* cited by examiner

*Primary Examiner* — Hau Phan
*Assistant Examiner* — Jacob Meyer
(74) *Attorney, Agent, or Firm* — Dinsmore & Shohl LLP

(57) ABSTRACT

A hybrid vehicle includes an engine, a front module, a drive wheel, a transmission, a case, an oil inlet, a return passage, and a bypass passage. The case has a first chamber accommodating the front module, and a second chamber accommodating the transmission. The second chamber includes an oil pan. The oil inlet is arranged inside the oil pan. The return passage communicates the first chamber with the second chamber. The return passage keeps a first oil level inside the first chamber higher than a second oil level inside the oil pan by applying flow resistance to oil. The bypass passage is arranged at a position higher than the first oil level when the hybrid vehicle is in a horizontal position and lower than the first oil level when the hybrid vehicle is leaning forward at a predetermined angle.

4 Claims, 4 Drawing Sheets

HYBRID VEHICLE

INCORPORATION BY REFERENCE

The disclosure of Japanese Patent Application No. 2014-052673 filed on Mar. 14, 2014 including the specification, drawings and abstract is incorporated herein by reference in its entirety.

BACKGROUND OF THE INVENTION

1. Field of the Invention

The invention relates to a hybrid vehicle.

2. Description of Related Art

Japanese Patent Application Publication No. 2013-155810 (JP 2013-155810 A) describes a hybrid vehicle. The hybrid vehicle includes a front module, a transmission, and a case. The front module includes an electric motor and a separating clutch. The separating clutch is provided in a power transmission path between the electric motor and an engine. The transmission is provided in a power transmission path between the electric motor and drive wheels. The case has a first chamber and a second chamber. The first chamber accommodates the front module. The second chamber accommodates the transmission. The hybrid vehicle described in JP 2013-155810 A is configured such that oil returned to an oil pan of the second chamber is drawn through an oil inlet arranged inside the oil pan and is fed under pressure to the transmission and into the first chamber. In this hybrid vehicle, the case has a return passage for returning oil, stored in the first chamber, back to the oil pan of the second chamber. The return passage is configured to constantly keep the oil level in the first chamber higher than the oil level in the second chamber by setting a flow resistance and a flow rate.

SUMMARY OF THE INVENTION

In the above-described hybrid vehicle, for example, when the vehicle is leaning forward in downhill traveling, the oil level stored in the first chamber rises, and then oil that returns into the second chamber decreases, with the result that there is a possibility that the oil inlet arranged inside the oil pan of the second chamber is exposed from the oil level.

The invention provides a hybrid vehicle that suppresses exposure of an oil inlet from the oil level stored in an oil pan.

A first aspect of the invention provides a hybrid vehicle. The hybrid vehicle includes an engine, a front module, a drive wheel, a transmission, a case, an oil inlet, a return passage, and a bypass passage. The front module includes an electric motor and a separating clutch. The separating clutch is provided in a power transmission path between the electric motor and the engine. The transmission is provided in a power transmission path between the electric motor and the drive wheel. The case has a first chamber and a second chamber. The first chamber accommodates the front module. The second chamber accommodates the transmission. The second chamber includes an oil pan. The oil inlet is arranged inside the oil pan. Oil returned to the oil pan of the second chamber being drawn through the oil inlet and being fed under pressure to the transmission and into the first chamber. The return passage is provided between the first chamber and the second chamber. The return passage is configured to flow oil stored inside the first chamber to the oil pan of the second chamber. The return passage is configured to keep a first oil level inside the first chamber higher than a second oil level inside the oil pan of the second chamber by applying flow resistance to oil flowing from the first chamber to the second chamber. The bypass passage is arranged at a position higher than the first oil level when the hybrid vehicle is in a horizontal position and lower than the second oil level when the hybrid vehicle is leaning forward at a predetermined angle. The bypass passage is configured to cause oil inside the first chamber to flow out into the second chamber when the hybrid vehicle is leaning forward at the predetermined angle.

In the hybrid vehicle, the bypass passage may include a first opening at a side of the first chamber, the first opening may be provided at a position that the first oil level reaches when the hybrid vehicle is leaning forward at the predetermined angle, and the bypass passage may include a second opening at a side of the second chamber, the second opening may be provided at a position lower than the first opening when the hybrid vehicle is leaning forward at the predetermined angle.

The hybrid vehicle may further include a torque converter arranged between the electric motor and the transmission. The case may further include a third chamber, the third chamber may be arranged between the first chamber and the second chamber, and the third chamber may accommodate the torque converter.

In the hybrid vehicle, the oil inlet may be arranged at a position at which the oil inlet is not exposed from the second oil level inside the oil pan even when the hybrid vehicle is leaning forward at the predetermined angle or when the hybrid vehicle is leaning backward at the predetermined angle.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described in detail with reference to the accompanying drawings. In the following embodiment, the drawings are modified or simplified where appropriate, and the scale ratio, shape, and the like, of each portion are not always drawn accurately.

Figure 1:
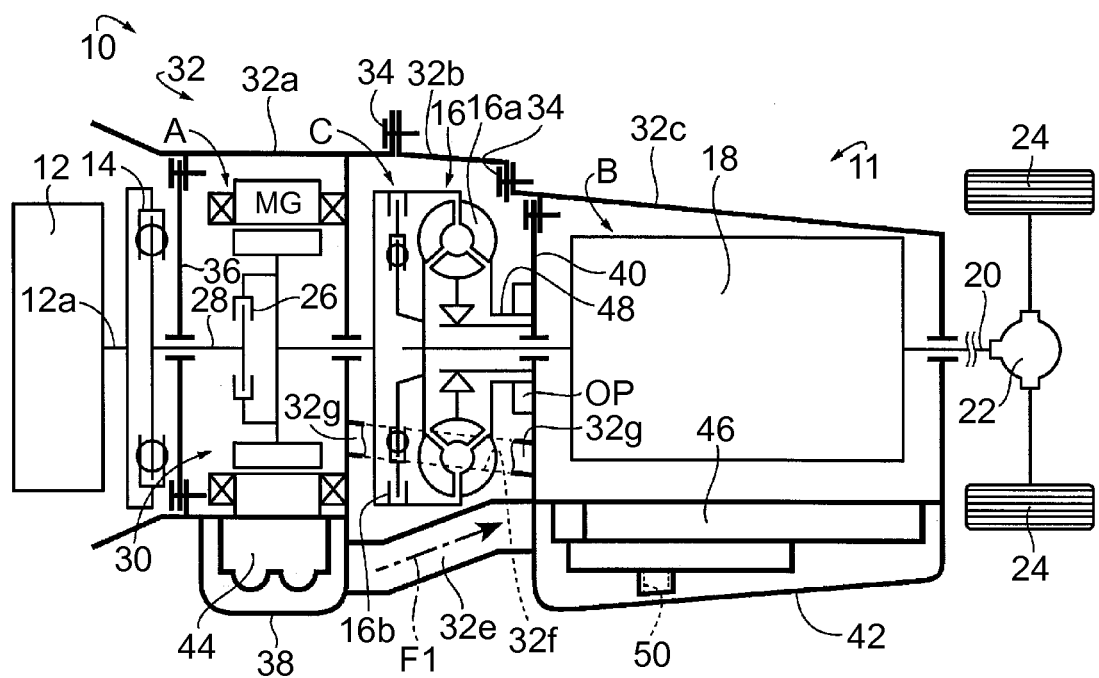
FIG. 1 is a skeletal view that schematically illustrates the configuration of a drive line of a hybrid vehicle according to an embodiment of the invention.

FIG. 1 is a skeletal view that illustrates the schematic configuration of a drive line 11 of a hybrid vehicle 10 to which the invention is applied, and is an example of a front-engine rear-drive (FR) drive line. The drive line 11 includes a damper device 14, an electric motor MG, a torque converter 16 and a transmission 18 along the same rotation axis C1 (see FIG. 2) in order from an engine 12 side. Driving force is transmitted from the transmission 18 to right and left drive wheels 24 via a propeller shaft 20 and a differential gear unit 22. The hybrid vehicle 10 is a so-called single-motor hybrid vehicle including the single electric motor MG.

As shown in FIG. 1, the damper device 14 is coupled to a crankshaft 12a of the engine 12, and a K0 clutch (separating clutch) 26 is provided in a power transmission path between the engine 12 and the electric motor MG. The K0 clutch 26 serves as a separating device that allows or interrupts transmission of power. The K0 clutch 26 is a wet-type multiple disc clutch that is frictionally engaged by hydraulic pressure, and is coupled to the damper device 14 via a first coupling shaft 28. The transmission 18 is a planetary gear-type stepped automatic transmission in which a plurality of gear positions having different speed ratios are established in accordance with engaged/released states of a plurality of clutch and brake. The transmission 18 is provided in a power transmission path between the electric motor MG and the drive wheels 24. Each of the clutch and brake of the transmission 18 is a hydraulic friction engagement device that is engaged by hydraulic pressure.

Figure 2:
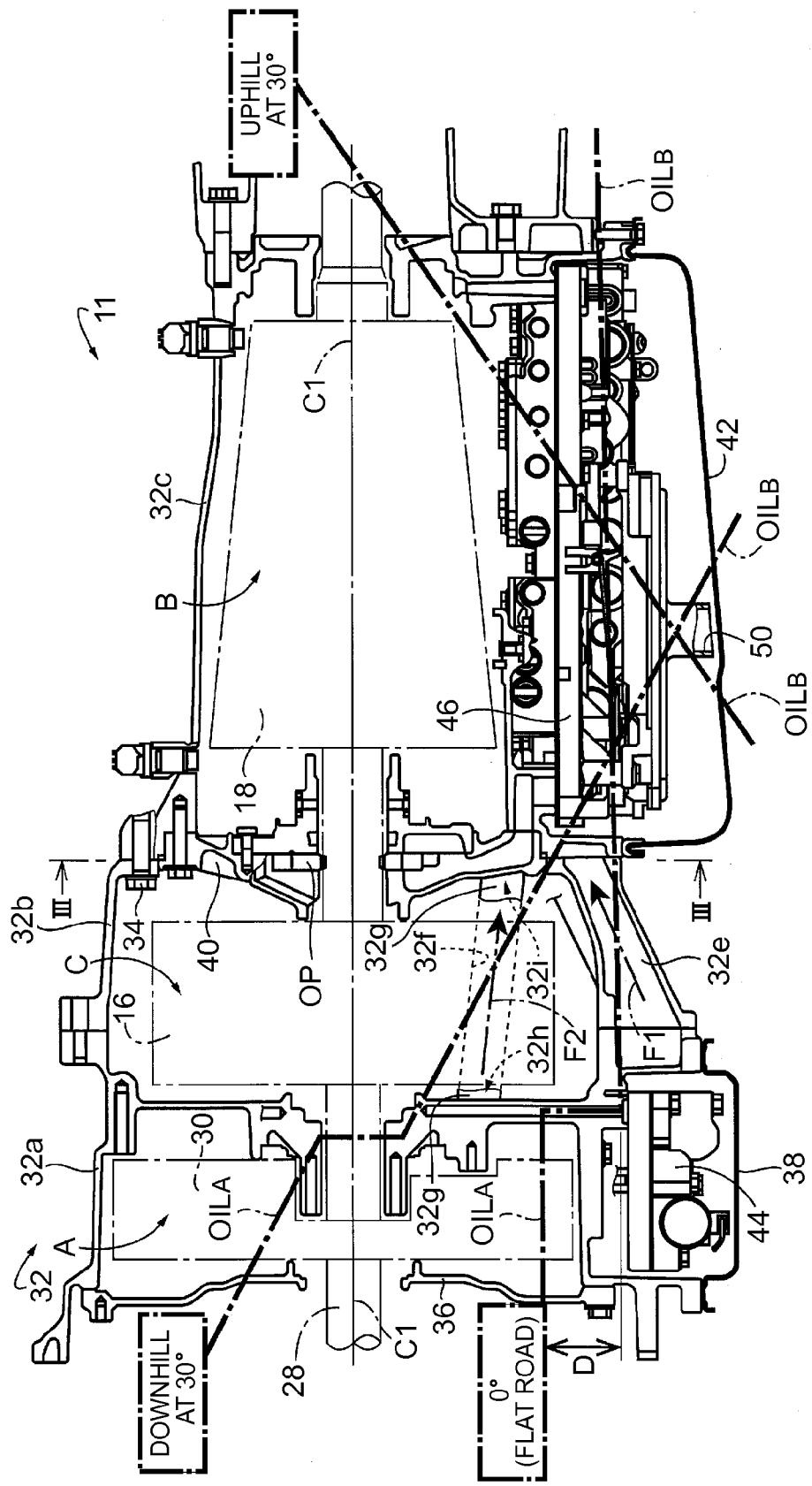
FIG. 2 is a cross-sectional view that illustrates the configuration of the drive line shown in FIG. 1.

As shown in FIG. 1 and FIG. 2, the drive line 11 includes a case 32. The case 32, for example, accommodates a front module 30, the torque converter 16, the transmission 18, and the like. The front module 30 includes the electric motor MG and the K0 clutch 26. The case 32 is a non-rotating member formed of three case members, and the like, that is, a first case 32a, a second case 32b and a third case 32c. The first case 32a accommodates, for example, the front module 30, and the like. The second case 32b is arranged adjacent to the first case 32a across from the engine 12, and accommodates, for example, the torque converter 16, and the like. The third case 32c is arranged adjacent to the second case 32b across from the engine 12, and accommodates, for example, the transmission 18, and the like. The case 32 is provided as a single case by fastening end faces (mating faces) of the case members in the direction of the rotation axis C1 with the use of, for example, bolts 34, or the like.

As shown in FIG. 1 and FIG. 2, the first case 32a includes a plate-shaped first side wall member 36 and a first oil pan 38. The first side wall member 36 functions as a side wall that closes the engine 12-side opening of the first case 32a. The first oil pan 38 closes the bottom-side opening of the first case 32a. The first case 32a, that is, the case 32, has a first chamber A that is surrounded by, for example, the first case 32a, the first side wall member 36, the first oil pan 38, and the like. The front module 30 is accommodated in the first chamber A.

As shown in FIG. 1 and FIG. 2, the third case 32c includes a plate-shaped second side wall member 40 and a second oil pan (oil pan) 42. The second side wall member 40 functions as a side wall that closes the engine 12-side opening of the third case 32c. The second oil pan 42 closes the bottom-side opening of the third case 32c. The third case 32c, that is, the case 32, has a second chamber B that is surrounded by, for example, the third case 32c, the second side wall member 40, the second oil pan 42, and the like. The transmission 18 is accommodated in the second chamber B.

As shown in FIG. 1 and FIG. 2, the second case 32b, that is, the case 32, has a third chamber C that is surrounded by, for example, the first case 32a, the second case 32b, the second side wall member 40, and the like. The torque converter 16 that is interposed between the electric motor MG and the transmission 18 is accommodated in the third chamber C. Inside the case 32, the third chamber C is arranged between the first chamber A and the second chamber B.

As shown in FIG. 1 and FIG. 2, an oil pump OP is fixed to the second side wall member 40 fixedly provided in the third case 32c, and the oil pump OP is coupled to a pump impeller 16a of the torque converter 16 via a cylindrical coupling member 48 (see FIG. 1) so as to be relatively non-rotatable. The case 32 includes a first hydraulic pressure control device 44 and a second hydraulic pressure control device 46. The first hydraulic pressure control device 44 is arranged at the bottom of the first case 32a. The second hydraulic pressure control device 46 is arranged at the bottom of the third case 32c. These first hydraulic pressure control device 44 and second hydraulic pressure control device 46 adjust or control the hydraulic pressure of oil supplied from the oil pump OP, and supplies the oil to portions of the drive line 11.

The first hydraulic pressure control device 44 includes, for example, a selector valve, a hydraulic pressure control valve, a hydraulic circuit, and the like. The selector valve and the hydraulic pressure control vale are used to execute engagement/release control over the K0 clutch 26. The hydraulic circuit is used to feed oil under pressure for lubricating or cooling portions of the K0 clutch 26, electric motor MG, a bearing, or the like. Therefore, oil inside the first oil pan 38, drawn by the oil pump OP, is fed under pressure to, for example, the K0 clutch 26 and the electric motor MG, that is, the front module 30, by the first hydraulic pressure control device 44. Thus, engagement/release control over the K0 clutch 26 is executed, and the oil is used to cool the K0 clutch 26 and the electric motor MG.

The second hydraulic pressure control device 46 includes, for example, a selector valve, a hydraulic pressure control valve, a hydraulic circuit, and the like. The selector valve and the hydraulic pressure control valve are used to execute shift control over the transmission 18 or engagement/release control over a lockup clutch 16b. The lockup clutch 16b is provided in the torque converter 16. The hydraulic circuit is used to feed oil under pressure for lubricating or cooling portions of the transmission 18, a bearing, or the like. Therefore, oil inside the second oil pan 42, drawn by the oil pump OP through an oil inlet 50 is fed under pressure to, for example, the transmission 18 and the torque converter 16, by the second hydraulic pressure control device 46. Thus, shift control over the transmission 18, engagement/release control over the lockup clutch 16b of the torque converter 16, and the like, are executed, and the oil is used to lubricate or cool the portions of the transmission 18. Part of oil inside the second oil pan 42, drawn by the oil pump OP through the oil inlet 50, is fed under pressure into the first chamber A of the case 32 by the second hydraulic pressure control device 46.

Figure 3:
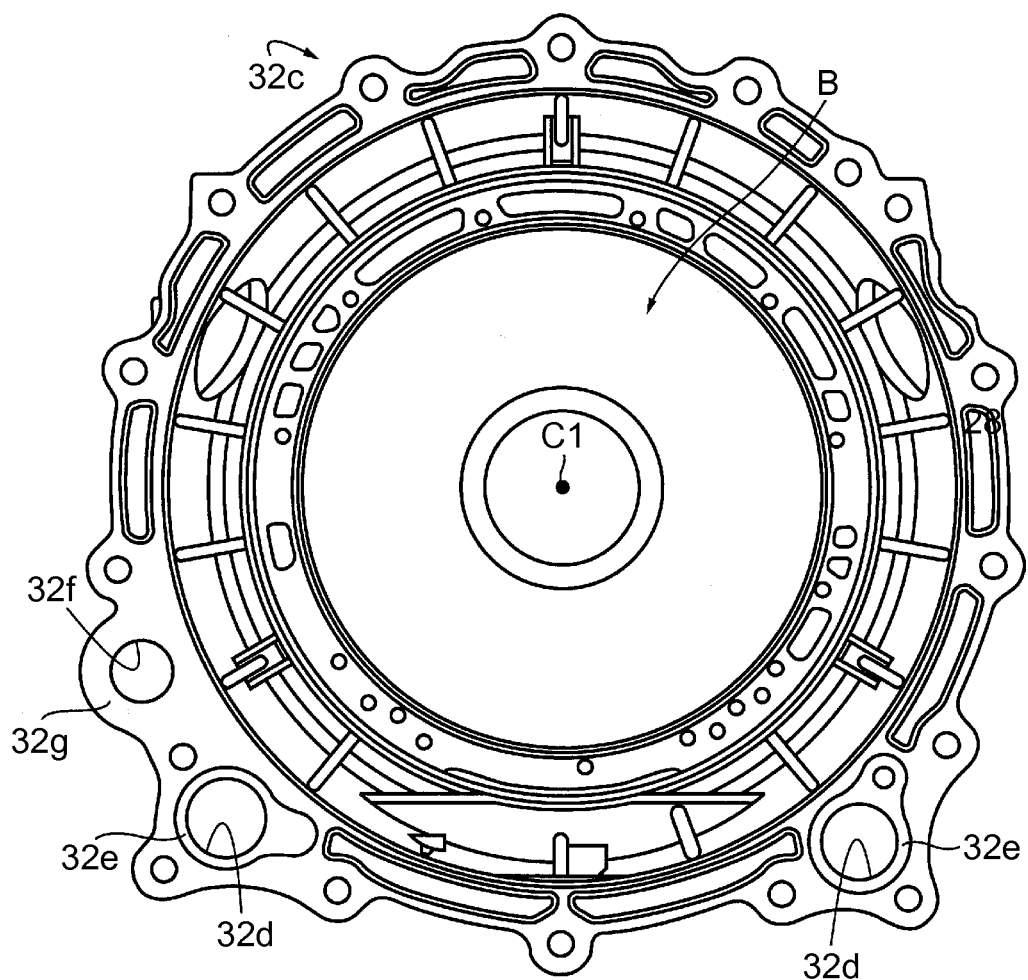
FIG. 3 is a cross-sectional view taken along the line III-III in FIG. 2.

As shown in FIG. 1 to FIG. 3, in order to return oil stored inside the first chamber A, that is, the first oil pan 38, into the second chamber B, that is, the second oil pan 42, an oil return portion 32e is integrally provided at the bottom of the case 32. The oil return portion 32e is provided between the first chamber A and the second chamber B. The oil return portion 32e has a pair of return passages 32d (see FIG. 3) that keep the oil level $OIL_A$ inside the first chamber A higher than the oil level $OIL_B$ inside the second oil pan 42 by applying flow resistance to oil flowing from the first chamber A to the second chamber B. Inside the case 32, part of oil returned into the second chamber B, that is, the second oil pan 42, is drawn through the oil inlet 50 arranged inside the second oil pan 42, and is fed under pressure to the first chamber A by the second hydraulic pressure control device 46. The oil fed under pressure into the first chamber A is returned into the second chamber B in an arrow F1 direction via the pair of return passages 32d with the use of a pressure head based on a difference D (see FIG. 2) between the oil level $OIL_A$ inside the first chamber A and the oil level $OIL_B$ inside the second chamber B.

Figure 4:
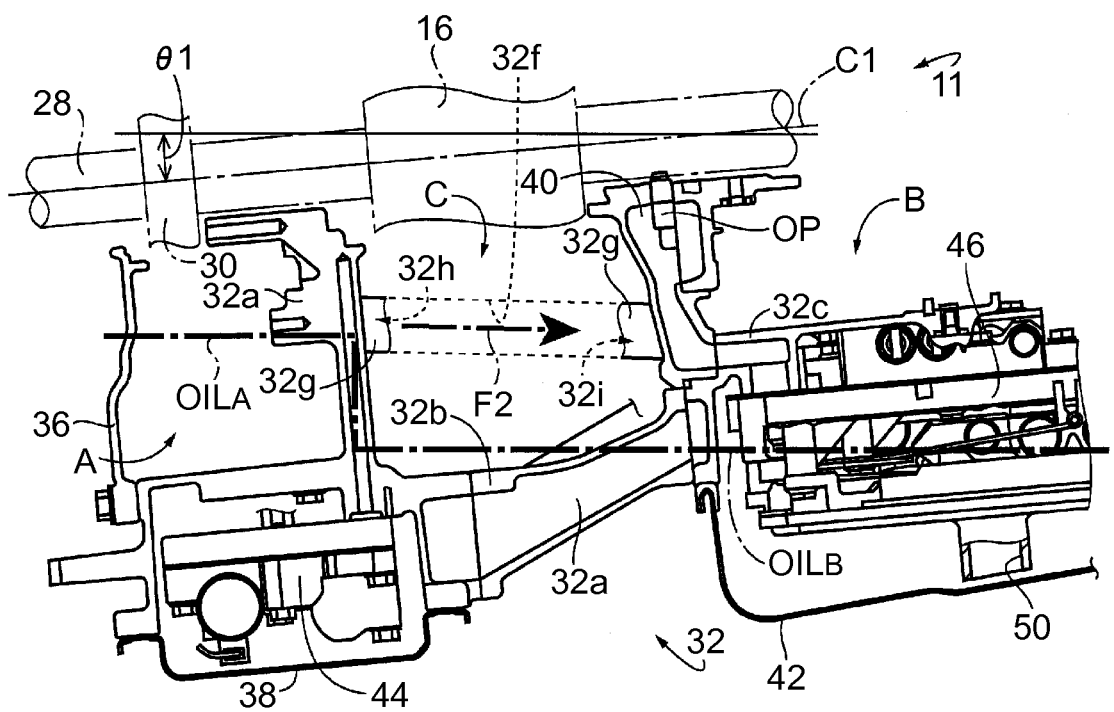
FIG. 4 is a cross-sectional view that shows a state inside the drive line of the hybrid vehicle according to the embodiment at the time when the hybrid vehicle is leaning forward at a predetermined angle in downhill traveling.

As shown in FIG. 2 to FIG. 4, an oil bypass portion 32g is integrally provided in the case 32. The oil bypass portion 32g is arranged at a position higher than the oil level $OIL_A$ (see FIG. 2) in the first chamber A when the hybrid vehicle 10 travels on a flat road and lower than the oil level $OIL_A$ (see FIG. 4) in the first chamber A when the hybrid vehicle 10 is leaning forward at a predetermined angle θ1. The oil bypass portion 32g has a bypass passage 32f that allows oil inside the first chamber A to flow into the second chamber B when the hybrid vehicle 10 is leaning forward at the predetermined angle θ1. FIG. 4 is a view that shows a state at the time when the hybrid vehicle 10 is leaning forward at the predetermined angle θ1 in downhill traveling, that is, a state at the time when the hybrid vehicle 10 is leaning forward at the predetermined angle θ1. As shown in FIG. 2, inside the case 32, the longitudinal position of the oil inlet 50 that draws oil stored in the second oil pan 42 is set such that the oil inlet 50 is not exposed from the oil level $OIL_B$ inside the second oil pan 42 even when the hybrid vehicle 10 leans forward at a predetermined forward leaning angle of, for example, 30° in downhill traveling or even when the hybrid vehicle 10 leans backward at a predetermined backward leaning angle of, for example, 30° in uphill traveling. In FIG. 2, the oil level $OIL_A$ inside the first chamber A and the oil level $OIL_B$ inside the second chamber B at the time when the hybrid vehicle 10 is in a flat position, that is, the hybrid vehicle 10 is not leaning forward or backward in flat road traveling, the oil level $OIL_A$ inside the first chamber A and the oil level $OIL_B$ inside the second chamber B when the hybrid vehicle 10 is leaning forward at the predetermined angle 30° in downhill traveling, and the oil level $OIL_B$ inside the second chamber B when the hybrid vehicle 10 is leaning backward at the predetermined angle 30° are imaginarily indicated by the alternate long and short dashed lines.

As shown in FIG. 4, in the bypass passage 32f, a first chamber A-side opening 32h of the bypass passage 32f is provided at a position that the oil level $OIL_A$ inside the first chamber A reaches when the hybrid vehicle 10 is leaning forward at the predetermined angle θ1 in downhill traveling, and a second chamber B-side opening 32i of the bypass passage 32f is provided at a position that is lower than the first chamber A-side opening 32h in a vertical direction when the hybrid vehicle 10 is leaning forward at the predetermined angle θ1. Therefore, for example, when the hybrid vehicle 10 leans forward at the predetermined angle θ1, oil inside the first chamber A is caused to flow out to the second chamber B in an arrow F2 direction via the bypass passage 32f.

In the thus configured hybrid vehicle 10, when the hybrid vehicle 10 leans forward at the predetermined angle θ1 or larger in downhill traveling, oil accumulates into the first chamber A of the case 32 in an unbalanced manner, and the oil level $OIL_A$ inside the first chamber A rises. As a result, the oil level $OIL_A$ inside the first chamber A reaches the first chamber A-side opening 32h of the bypass passage 32f, and oil is caused to flow out from the second chamber B-side opening 32i of the bypass passage 32f toward the second chamber B.

As described above, with the hybrid vehicle 10 according to the present embodiment, when oil unevenly accumulates inside the first chamber A as a result of forward leaning of the hybrid vehicle 10 at the predetermined angle θ1 or larger and, as a result, the oil level $OIL_A$ inside the first chamber A rises, oil inside the first chamber A is returned to the second chamber B via the bypass passage 32f. Therefore, the oil level $OIL_B$ inside the second oil pan 42 of the second chamber B rises, and exposure of the oil inlet 50 from the oil level $OIL_B$ stored in the second oil pan 42 is suppressed.

With the hybrid vehicle 10 according to the present embodiment, the first chamber A-side opening 32h of the bypass passage 32f is provided at the position that the oil level $OIL_A$ inside the first chamber A reaches when the hybrid vehicle 10 is leaning forward at the predetermined angle θ1, and the second chamber B-side opening 32i of the bypass passage 32f is provided at the position lower than the first chamber A-side opening 32h when the hybrid vehicle 10 is leaning forward at the predetermined angle θ1. Therefore, when the hybrid vehicle 10 is leaning forward at the predetermined angle θ1 or larger, the oil level $OIL_A$ inside the first chamber A reaches the first chamber A-side opening 32h of the bypass passage 32f, and oil is allowed to return from the second chamber B-side opening 32i of the bypass passage 32f, which is provided at the position lower than the first chamber A-side opening 32h, toward the second chamber B.

With the hybrid vehicle 10 according to the present embodiment, the case 32 has the third chamber C between the first chamber A and the second chamber B, and the third chamber C accommodates the torque converter 16 interposed between the electric motor MG and the transmission 18.

With the hybrid vehicle 10 according to the present embodiment, the oil inlet 50 that draws oil stored in the second oil pan 42 is arranged at the position at which the oil inlet 50 is not exposed from the oil level $OIL_B$ inside the second oil pan 42 even when the hybrid vehicle is leaning forward at the predetermined angle of, for example, 30° or is leaning backward at the predetermined angle of, for example, 30°. Therefore, even when the hybrid vehicle 10 is leaning forward or is leaning backward at the predetermined angle, the oil inlet 50 is suitably not exposed from the oil level $OIL_B$ inside the second oil pan 42. The predetermined angle is, for example, 30°.

The embodiment of the invention is described in detail with reference to the drawings; however, the invention is also applicable to other embodiments.

For example, in the above-described embodiment, the second chamber B-side opening 32i of the bypass passage 32f is provided at the position lower than the first chamber A-side opening 32h; however, the second chamber B-side opening 32i does not always need to be provided at the low position. For example, the second chamber B-side opening 32i may be provided at the same position as the first chamber A-side opening 32h of the bypass passage 32f. That is, as long as oil inside the first chamber A is caused to flow out from the second chamber B-side opening 32i of the bypass passage 32f to the second chamber B when the hybrid vehicle 10 is leaning forward at the predetermined angle θ1 and then the oil level $OIL_A$ inside the first chamber A has reached the first chamber A-side opening 32h of the bypass passage 32f, the second chamber B-side opening 32i of the bypass passage 32f does not need to be provided at the position lower than the first chamber A-side opening 32h.

The above-described embodiment is only illustrative, and the invention may be implemented in modes including various modifications or improvements on the basis of the knowledge of persons skilled in the art.

What is claimed is:
1. A hybrid vehicle comprising:
an engine;
a front module including an electric motor and a separating clutch, the separating clutch being provided in a power transmission path between the electric motor and the engine;
a drive wheel;
a transmission provided in a power transmission path between the electric motor and the drive wheel;
a case having a first chamber and a second chamber, the first chamber accommodating the front module, the second chamber accommodating the transmission, the second chamber including an oil pan;
an oil inlet arranged inside the oil pan, oil returned to the oil pan of the second chamber being drawn through the oil inlet and being fed under pressure to the transmission and into the first chamber;

a return passage provided between the first chamber and the second chamber, the return passage being configured to flow oil stored inside the first chamber to the oil pan of the second chamber, the return passage being configured to keep a first oil level inside the first chamber higher than a second oil level inside the oil pan of the second chamber by applying flow resistance to oil flowing from the first chamber to the second chamber; and a bypass passage arranged at a position higher than the first oil level when the hybrid vehicle is in a horizontal position and lower than the first oil level when the hybrid vehicle is leaning forward at a predetermined angle, the bypass passage being configured to cause oil inside the first chamber to flow out into the second chamber when the hybrid vehicle is leaning forward at the predetermined angle.

2. The hybrid vehicle according to claim 1, wherein the bypass passage includes a first opening at a side of the first chamber, the first opening is provided at a position that the first oil level reaches when the hybrid vehicle is leaning forward at the predetermined angle, and the bypass passage includes a second opening at a side of the second chamber, the second opening is provided at a position lower than the first opening when the hybrid vehicle is leaning forward at the predetermined angle.

3. The hybrid vehicle according to claim 1, further comprising:

a torque converter arranged between the electric motor and the transmission, wherein the case further has a third chamber, the third chamber is arranged between the first chamber and the second chamber, and the third chamber accommodates the torque converter.

4. The hybrid vehicle according to claim 1, wherein the oil inlet is arranged at a position at which the oil inlet is not exposed from the second oil level inside the oil pan even when the hybrid vehicle is leaning forward at the predetermined angle or when the hybrid vehicle is leaning backward at the predetermined angle.

\* \* \* \* \*